(12) United States Patent
Doany et al.

(10) Patent No.: US 9,013,274 B2
(45) Date of Patent: Apr. 21, 2015

(54) MAGNETOMECHANICAL MARKERS FOR MARKING STATIONARY ASSETS

(75) Inventors: Ziyad H. Doany, Austin, TX (US); Dean M. Dowdle, White Bear Lake, MN (US); Michael E. Hamerly, Vadnais Heights, MN (US); William C. Egbert, Minneapolis, MN (US); Terrence H. Joyce, Jr., Lakeville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1000 days.

(21) Appl. No.: 12/888,272

(22) Filed: Sep. 22, 2010

(65) Prior Publication Data

US 2012/0068823 A1    Mar. 22, 2012

(51) Int. Cl.
  *G08B 5/22*   (2006.01)
  *G08B 13/14*  (2006.01)
  *H04Q 5/22*   (2006.01)
  *G01V 1/112*  (2006.01)
  *G01V 3/08*   (2006.01)
  *G08B 21/00*  (2006.01)
  *G01V 15/00*  (2006.01)
  *G08B 13/24*  (2006.01)
  *G06K 19/067* (2006.01)

(52) U.S. Cl.
  CPC ............ *G01V 15/00* (2013.01); *G08B 13/2437* (2013.01); *G01V 3/081* (2013.01); *G06K 19/0672* (2013.01)

(58) Field of Classification Search
  USPC .......... 340/8.1, 572.6, 551; 324/326, 26, 329; 148/304, 311, 108, 307, 310, 403
  See application file for complete search history.

(56) References Cited

U.S. PATENT DOCUMENTS

| 4,510,489 | A | * | 4/1985  | Anderson et al. | 340/572.1 |
| 4,510,490 | A | * | 4/1985  | Anderson et al. | 340/572.1 |
| 4,622,543 | A |   | 11/1986 | Anderson, III et al. | |
| 4,647,917 | A | * | 3/1987  | Anderson et al. | 340/572.4 |
| 4,862,088 | A | * | 8/1989  | Etienne et al. | 324/326 |
| 4,940,966 | A |   | 7/1990  | Pettigrew et al. | |
| 5,001,458 | A | * | 3/1991  | Tyrén et al. | 340/551 |
| 5,006,806 | A |   | 4/1991  | Rippingale | |
| 5,017,415 | A |   | 5/1991  | Cosman et al. | |
| 5,045,368 | A |   | 9/1991  | Cosman et al. | |
| 5,116,654 | A |   | 5/1992  | Cosman et al. | |
| 5,430,379 | A | * | 7/1995  | Parkinson et al. | 324/329 |
| 5,495,230 | A | * | 2/1996  | Lian | 340/572.1 |
| 5,532,598 | A |   | 7/1996  | Clark, Jr. et al. | |
| 5,786,762 | A | * | 7/1998  | Liu | 340/551 |
| 6,020,817 | A | * | 2/2000  | Copeland et al. | 340/551 |
| 6,181,249 | B1 | * | 1/2001 | Maitin et al. | 340/572.3 |
| 6,359,563 | B1 | * | 3/2002 | Herzer | 340/572.6 |

(Continued)

OTHER PUBLICATIONS

International Search Report for PCT/US2011/051786, mailed Oct. 14, 2011, prepared by the Australian Patent Office.

*Primary Examiner* — Fekadeselassie Girma
(74) *Attorney, Agent, or Firm* — Gregg H. Rosenblatt

(57) ABSTRACT

An article, system and method related to a magnetomechanical marker used to mark stationary assets. Magnetomechanical markers can be arranged in clusters and associated with stationary assets, including assets buried underground. Markers can be associated with an asset by being attached to the asset, arranged in a particular spatial relationship with the asset, or in any other appropriate way. A portable locating device can be used to generate an alternating magnetic field to activate the magnetomechanical marker and thus locate the asset.

18 Claims, 7 Drawing Sheets

(56) References Cited

U.S. PATENT DOCUMENTS

| | | |
|---|---|---|
| 6,407,676 B1 | 6/2002 | Tanji et al. |
| 6,478,229 B1 | 11/2002 | Epstein |
| 6,538,446 B2 | 3/2003 | Minarovic |
| 6,850,161 B1 | 2/2005 | Elliott et al. |
| 7,075,440 B2 | 7/2006 | Fabian et al. |
| 7,158,034 B2 | 1/2007 | Corbett, Jr. |
| 7,616,119 B2 | 11/2009 | Corbett, Jr. |
| 2004/0074566 A1* | 4/2004 | Herzer et al. ............... 148/113 |
| 2005/0242956 A1* | 11/2005 | Sorkine ...................... 340/572.6 |
| 2007/0013379 A1* | 1/2007 | Staples et al. ................. 324/326 |
| 2008/0136571 A1* | 6/2008 | Peter et al. .................... 335/306 |
| 2008/0252449 A1 | 10/2008 | Colvero et al. |
| 2008/0297353 A1* | 12/2008 | Patterson et al. .......... 340/572.3 |
| 2009/0195386 A1* | 8/2009 | Peter et al. ................. 340/572.1 |
| 2010/0085234 A1* | 4/2010 | Steinway et al. ............... 342/22 |
| 2010/0109670 A1 | 5/2010 | Arnaud |
| 2010/0148965 A1* | 6/2010 | Alexis et al. ............... 340/572.1 |
| 2010/0259391 A1* | 10/2010 | Gadonniex et al. ........ 340/572.6 |
| 2011/0181289 A1* | 7/2011 | Rushing ....................... 324/326 |

* cited by examiner

MAGNETOMECHANICAL MARKERS FOR MARKING STATIONARY ASSETS

FIELD OF DISCLOSURE

The present disclosure pertains to magnetomechanical markers for use in marking stationary assets. More particularly, the present disclosure relates to using magnetomechanical markers for marking assets buried underground.

BACKGROUND

Conduits, such as pipes for water, gas, and sewage and cables for telephone, power, and television are buried underground around the world. It often becomes important to know the location of a conduit or other underground asset. For example, a construction company may want to ensure they are not damaging any buried assets before digging for a foundation. A gas company has an interest in being able to locate its underground pipes when they leak. A telephone company may need to connect new telephone cables to existing cables. In each of these instances, it can be useful to know not only where an underground asset is buried, but also what kind of asset is buried there and who owns it.

Underground assets have traditionally been marked by several different methods. Visual markers or other indicators can be installed immediately after an asset is buried, but such markers can be lost, stolen, or destroyed. Visual markers, such as warning tape, can also be installed underground, often buried several feet above an underground asset. Individuals digging or excavating then come into contact with the visual marker first, to alert them to the presence of an asset below or close to the visual marker. However, such visual markers only provide notice after a person has started digging, meaning that the person could be digging in the wrong place for some time before realizing it.

Tracer wire has been used to electrically mark the path of an underground conduit. Tracer wire is sometimes buried with the conduit or asset. When one end of the tracer wire is activated with an alternating current (AC) signal, the wire conducts the current and radiates an electromagnetic signal. A separate receiver above ground can detect the signal and thereby determine the path of the tracer wire and corresponding asset. If a break occurs in the wire, the AC signal is not conducted beyond the point of the break, so no information may be available after that point. Further, the tracer wire needs to be accessible from ground level in order to be activated and does not provide a visual warning prior to reaching the approximate level of the buried asset.

Passive inductive markers have also been used to mark underground assets. Such markers typically include a wire coil and a capacitor located in a protective housing. The inductive marker is then buried near the item to be marked. Inductive markers are activated by generating a magnetic field into the ground in the area where the marker is expected to be found. The magnetic field couples with the marker, and the inductive marker receives and stores energy from the coupled magnetic field during the transmission cycle. When the transmission cycle ends, the inductive marker re-emits the signal at the same frequency with an exponentially decaying amplitude. A detecting device above ground detects the signal from the marker and alerts the user to the presence of the marker.

Underground warning tapes and inductive markers are typically color coded according to the type of utility they mark. Specifically, gas-line markers are yellow; telephone cable markers are orange; waste water markers are green; water pipe markers are blue; and power supply markers are red. Similarly, inductive markers are frequently coded by tuning the coil to a particular frequency to represent a particular type of utility. The frequencies traditionally used are: 83.0 kHz for gas; 101.4 kHz for telecomm; 121.6 kHz for waste water; 145.7 kHz for water; and 169.8 kHz for power. A locating technician can use a locator tuned to the frequency for the desired utility. For example, if a technician is searching for telephone lines, he must use a locator tuned to 101.4 kHz. That locator will activate only inductive markers also tuned to that frequency.

Factors influencing marker choice include the cost, need to identify the particular asset buried, the need to know the path of the buried asset, the depth (below ground) of the asset, and the required marker depth. These factors can be important in designing a marker system for assets underground.

SUMMARY

The present disclosure is directed generally to the use of magnetomechanical markers in marking stationary assets. Magnetomechanical markers as described can provide a viable low cost option for marking stationary assets buried underground. Magnetomechanical markers can have the added advantage of providing a remote indication of an asset location where line-of-sight to the marker is not required. Additionally, in contrast to tracer wire, if a carrier for magnetomechanical markers is severed, this does not impair functionality of magnetomechanical markers because they can be discrete, not continuous.

In one aspect, the present disclosure is directed to an article for marking an asset buried underground. The article includes at least one magnetomechanical marker, and the article is associated with the asset.

In another aspect, the present disclosure is related to a method of marking an asset buried underground. The method includes at least providing at least one magnetomechanical marker, providing a carrier, wherein at least one marker is attached to the carrier, and associating the marker with the asset.

In another aspect, the present disclosure is directed to a system for locating an asset buried underground. The system includes a marking component and a portable locating device. The marking component includes at least one magnetomechanical marker, and the locating device includes at least a single antenna and a battery.

BRIEF DESCRIPTION OF THE DRAWINGS

The invention may be more completely understood in consideration of the following detailed description of various embodiments of the invention in connection with the accompanying drawings, in which.

The accompanying drawings are shown to illustrate various embodiments of the present invention. It is to be understood that the embodiments may be utilized, and structural changes may be made, without departing from the scope of the present invention. The figures are not necessarily to scale. Like numbers used in the figures generally refer to like components. However, it will be understood that the use of a number to refer to a component in a given figure is not intended to limit the component in another figure labeled with the same number.

DETAILED DESCRIPTION

The present disclosure relates to a magnetomechanical marker for marking underground stationary assets that can result in a low cost solution for marking stationary assets. Such a magnetomechanical marker for marking stationary assets can also provide a generic marker used to identify the presence of an item of interest, without specifically identifying the asset.

Figure 1:
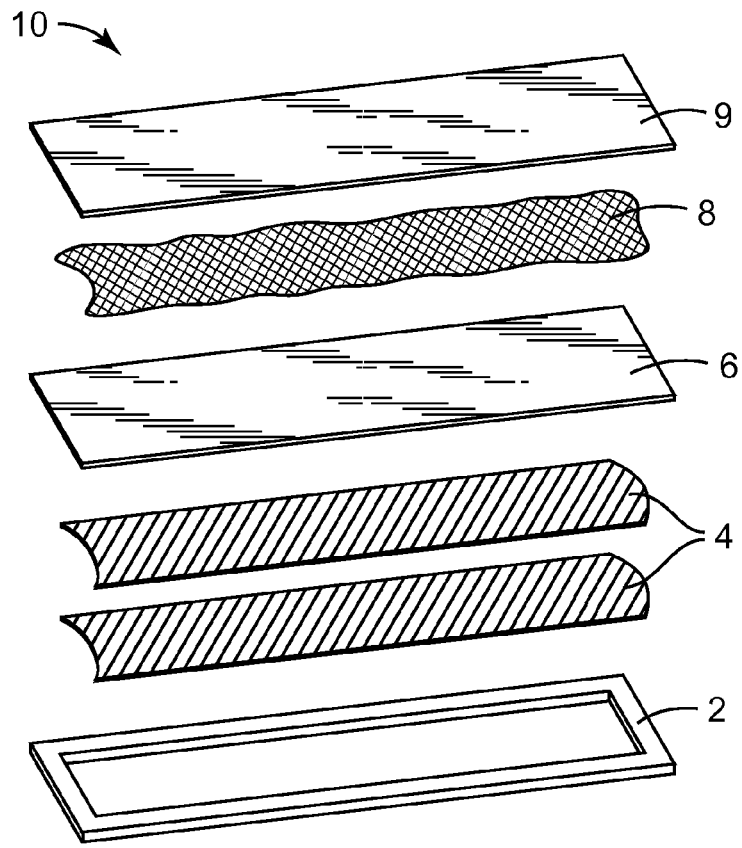
FIG. 1 shows an exploded view of an exemplary magnetomechanical marker.

FIG. 1 shows an exploded view of an exemplary magnetomechanical marker 10. In the illustrated figure, the marker 10 includes a housing 2, resonator pieces 4, a cover 6 over the resonator pieces 4, and magnetic bias layer 8 disposed between cover 6 and housing cover 9. Resonator 4 is a ferromagnetic material with magnetostrictive properties, such as a magnetic amorphous alloy or crystalline material such as Metglas® 2826 MB, 2605SA1 or 2605S3A made by Metglas®, Inc. of Conway, S.C., or similar material which is magnetically biased by magnetic bias layer 8, such as a permanent magnet or a magnetically hard or semi-hard metal strip. Because a magnetically hard magnetic bias layer 8 is not readily changeable, it can prove to be advantageous in an application consistent with the present disclosure because its bias characteristics are less likely to be inadvertently changed when buried underground. Magnetomechanical marker 10 resonates at its characteristic frequency when interrogated with an alternating magnetic field tuned to this frequency. Energy is stored in the marker 10 during this interrogation period in the form of both magnetic and mechanical energy (manifested as resonator vibrations). When the interrogation field is removed, the resonator continues to vibrate and releases significant alternating magnetic energy at its resonant frequency that can be remotely sensed with a suitable detector. Such a response alerts a locating technician to the presence of magnetomechanical marker 10.

Magnetomechanical markers 10 within the scope of the present disclosure can be constructed with a number of variations. Housing 2 can be plastic or any other non-conductive material. One important factor when choosing material for housing 2 is ensuring that the housing can maintain its shape or spacing around resonator 4, allowing sufficient room for resonator 4 to resonate or vibrate. Resonator pieces 4 may be a single resonator piece, two (as illustrated FIG. 1), or three or more. Resonator pieces 4 can be made of specialty magnetic materials such as Metglas® 2826 MB or 2605 amorphous alloys or similar materials such as those made by Vacuumschmelze GmbH of Hanau, Germany.

Resonators 4 can resonate at any desired frequency dependent primarily upon their length, the strength of the magnetic bias field, the materials density, and the materials Young's modulus. While resonators 4 can physically be designed to resonate at a wide range of frequencies, it may desirable to tune resonators 4 to particular frequencies. For example, resonators 4 may be designed to resonate at a frequency in the range of about 25 kHz to 45 kHz or within the range of about 45 kHz to 75 kHz. One could choose multiple frequencies within a range and use each frequency to encode a piece of information, such as what type of asset is being marked. For example, the frequencies could be separated by 4 kHz intervals, such as, 46 kHz, 50 kHz, 54, kHz, 58 kHz, 62 kHz, etc. Because of some natural variation in resonators 4, frequencies within a given range could be correlated with a target frequency within that range. For example, for a frequency of 58 kHz, any frequency within the range of 57 kHz to 59 kHz could be associated with the same information associated with a frequency of 58 kHz.

Resonators 4 can also be designed to resonate at frequencies traditionally associated with particular assets, such as, 83.0 kHz for gas; 101.4 kHz for telecomm; 121.6 kHz for waste water; 145.7 kHz for water; and 169.8 kHz for power. Alternatively the resonators can be designed to resonate at frequencies lower than 58 kHz. A resonator with a length of 37 mm, thickness of about 0.02 to 0.03 mm, and width of about 6 mm can respond to an interrogation frequency of about 58 kHz. One exemplary resonator that responds to interrogation frequency of about 58 kHz is Ultra Strip® III from Sensormatic Electronics Corporation, headquartered in Boca Raton, Fla.

The signal strength of resonators 4 can be an important factor in ensuring that markers can be located after they are buried underground. Signal strength of resonators 4 is dependent on factors such as length and width of the resonator 4, the volume of the resonator material, the bias field impressed on the resonators by the magnetic bias layer, the magnetomechanical coupling factor k of the resonator material and the magnitude of the interrogating magnetic field experienced by the resonator 4. In some embodiments, multiple resonators 4 included in a single marker can be used to improve signal strength. However, if a resonator 4 or the combination of multiple resonators 4 is too thick, this could inhibit a resonator's ability to resonate.

Cover 6 can be made of the same materials as housing 2, or any other appropriate materials. Cover 6 can be used to secure resonator within housing 2 and to provide a physical separation between resonator 4 and magnetic bias layer 8, preserving the ability of resonator 4 to vibrate in response to an interrogation field.

Magnetic bias layer 8 can be made from any magnetic material that has sufficient magnetic remanence when magnetized to appropriately bias the resonators, and sufficient magnetic coercivity so as to not be magnetically altered in normal operating environments. A commercially available magnetic material such as Arnokrome™ III from The Arnold Engineering Company of Marengo, Ill., is one exemplary material for the magnetic bias layer 8, though other materials could serve equally well. Magnetic bias layer 8 can have dimensions similar to those of resonator 4. As with all linear or bar magnets, magnetic bias layer 8 has magnetic poles, one at each end.

Housing cover 9 can be made from the same material as housing 2, or any other desired material. Housing cover 9 can seal and secure magnetic bias layer 8 and resonator 4 within housing 2. Housing cover 9 can be secured to housing 2 by any desired method, such as using, for example, adhesive, heat sealing or ultrasonic welding. While housing 2 and housing cover 9 are shown as two discrete components, housing for a magnetomechanical marker can take any workable form as would be recognized by one of skill in the art upon reading this disclosure.

In accordance with the present disclosure, magnetomechanical marker 10 can be associated with an asset buried underground. An article including a magnetomechanical marker 10 can also be associated with an asset. A marker or an article including a marker can be associated with an asset so that it is physically attached to the asset, incorporated into the asset, in the same vertical plane as the asset, whether disposed above or below the asset, or offset from the asset, including being offset to the side of the asset.

In some embodiments, where the marker or article is not physically attached to the asset, the marker or article may be within a 30 cm, 60 cm or 1 meter radius of the asset.

Figure 2:
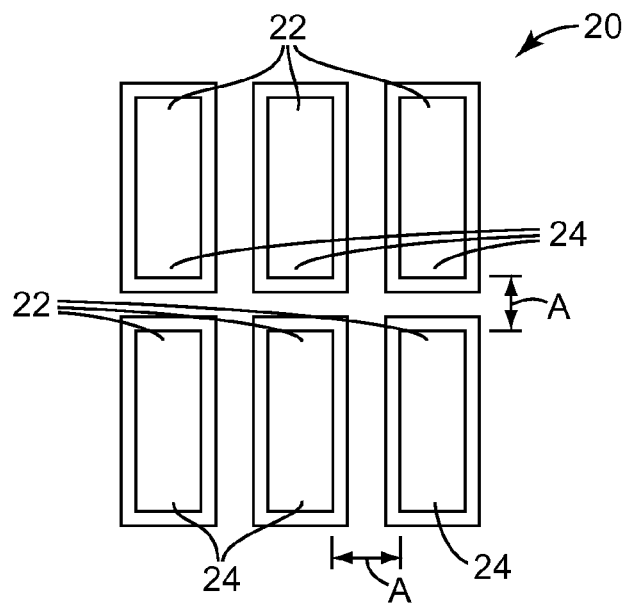
FIG. 2 shows a cluster of magnetomechanical markers.

FIG. 2 shows a cluster 20 of magnetomechanical markers 10 consistent with the present disclosure. Clusters 20 are generally arranged so that the signals from multiple markers 10 are additive. In the illustrated configuration, markers are arranged in a substantially parallel array. The markers 10 are oriented so the magnetic polarity of each marker's magnetic bias layer is the same. The magnetic north poles 22 are facing generally the same direction and magnetic south poles 24 are facing the same direction as each other, and in the opposite direction of the north poles 22. Within a cluster 20 of magnetomechanical markers 10, each marker 10 is preferably placed an appropriate distance A from each other. In one embodiment, distance A is preferably greater than 3 mm. Distances A can also be longer, for example, in the range of 3 mm to 1 cm, or greater than 1 cm or 2 cm or more. Several factors can influence a determination of distances A. For example, when two markers are near each other, the magnetic bias layer of one marker can influence a neighboring marker, causing a shift in resonant frequency. On the other hand, long distances A between two neighboring or adjacent markers can diminish the received signal amplitude. As shown in FIG. 2, markers in a cluster can be in a parallel array in a side-by-side configuration and an end-to-end configuration, or in any other appropriate configuration.

Figure 3A:
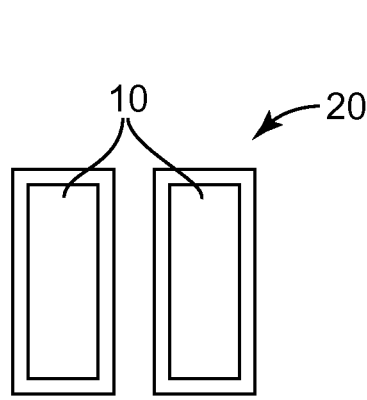
FIG. 3A shows a cluster of magnetomechanical markers arranged in a side-by-side parallel array.
Figure 3B:
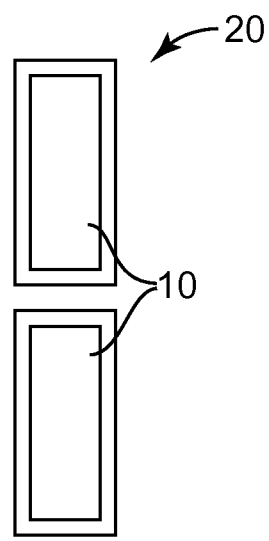
FIG. 3B shows a cluster of magnetomechanical markers arranged in an end-to-end parallel array.
Figure 3C:
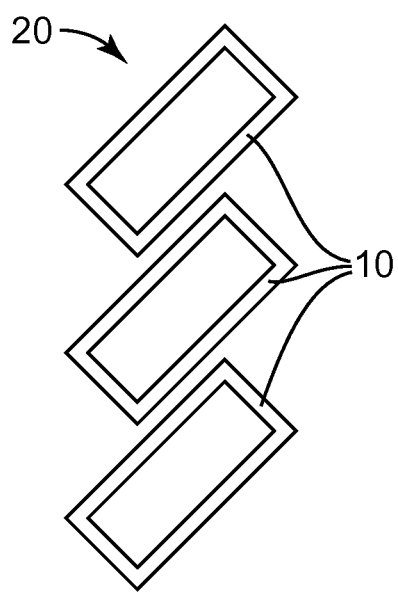
FIG. 3C shows a cluster of magnetomechanical markers arranged in a diagonal side-by-side parallel array.
Figure 3D:
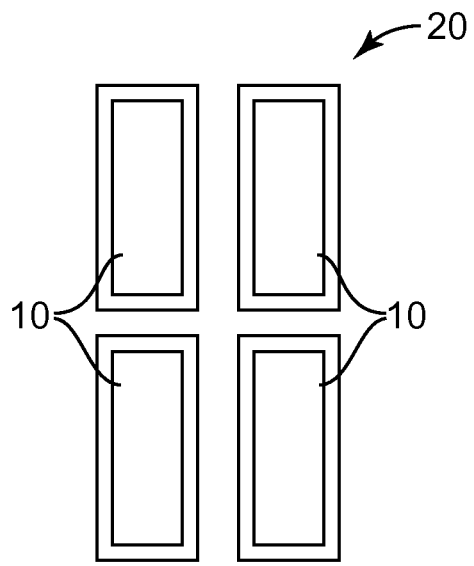
FIG. 3D shows a cluster of magnetomechanical markers arranged in a multi-directional parallel array.

FIGS. 3A-3D show clusters of magnetomechanical markers arranged in a variety of configurations. FIG. 3A shows a cluster of magnetomechanical markers arranged in a side-by-side parallel array. FIG. 3B shows a cluster of magnetomechanical markers arranged in an end-to-end parallel array. FIG. 3C shows a cluster of magnetomechanical markers arranged in a diagonal side-by-side parallel array. FIG. 3D shows a cluster of magnetomechanical markers arranged in a two-dimensional parallel array. In each of these configurations, when the magnetic north poles and magnetic south poles of the magnetic bias layers within the markers 10 are in the same direction as shown in FIG. 2, the response of the markers can be additive. This results in a cumulative response from the cluster 20 of markers 10 with greater signal strength than the response of a single marker, as discussed further in the Examples section.

Figure 4:
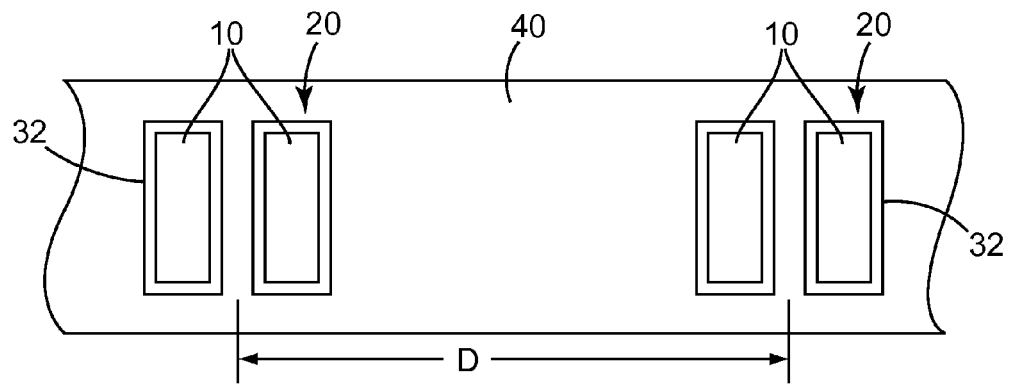
FIG. 4 shows two clusters of magnetomechanical markers attached to a carrier.

FIG. 4 shows two clusters 20 of magnetomechanical markers 10 attached to a carrier 40. A carrier can be any substrate or other object to which markers 10 can be attached. For example, a substrate may be a warning tape, such as Scotch® Barricade Tape Series 600HS made by 3M Company of St. Paul, Minn. Any other workable substrate or carrier 40 could be used, for example, any carrier that can be constructed such that it can hold, contain, or have markers affixed to it and is generally non-conductive. Markers 10 attached to carrier 40 can form an article associated with an asset. The article or the markers can be physically attached to an asset, incorporated into an asset, in the same vertical plane as an asset, whether disposed above or below an asset, or reasonably offset from an asset, including being offset to the side of the asset.

Figure 5A:
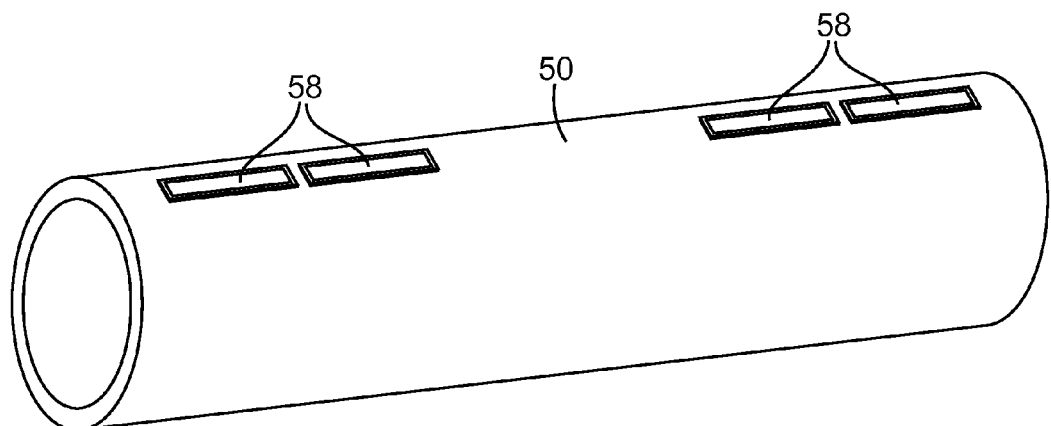
FIG. 5A shows a magnetomechanical marker attached to an asset in a substantially planar configuration.

FIG. 5A shows magnetomechanical markers 58 attached to an asset 50 in a substantially planar configuration. In this particular configuration, clusters 20 of magnetomechanical markers 58 are arranged in an end-to-end parallel configuration and attached to asset 50. Asset 50 can be any underground asset to be tracked or located. For example, it can be a stationary asset, such as a utility pipe or cable buried underground. Asset 50 can also be a valve, connection, or any other item buried underground.

Figure 5B:
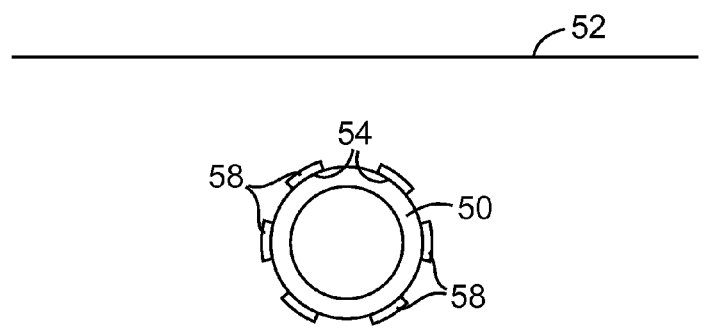
FIG. 5B shows a plurality of magnetomechanical markers attached to an asset in a curved configuration.

FIG. 5B shows a plurality of magnetomechanical markers 58 attached to an asset 50 in a curved configuration, located around the circumference of the asset 50. Magnetomechanical markers 58 can be attached by any desired method, such as adhesive 54, mechanical attachment systems, or can be manufactured into the structure of an asset 50. Asset 50 can be buried below ground level 52.

Figure 6A:
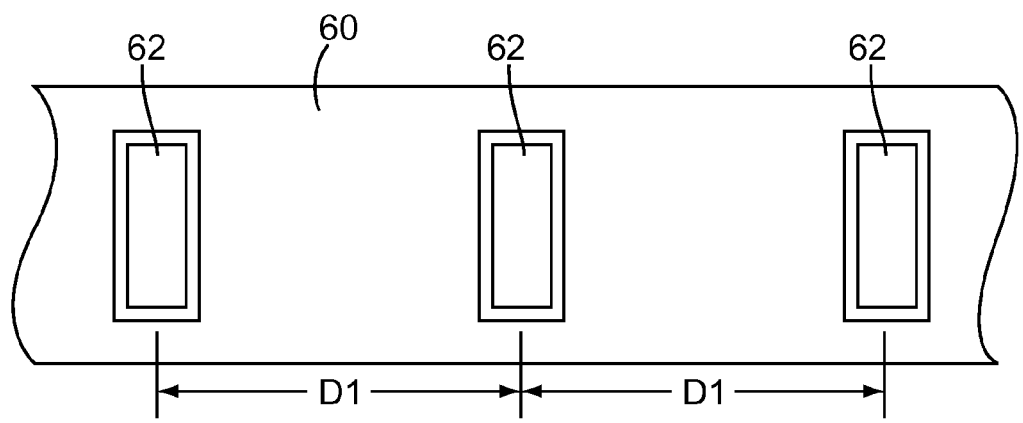
FIG. 6A shows an example of markers spaced at a predetermined distance from each other where the distance is regular.
Figure 6B:
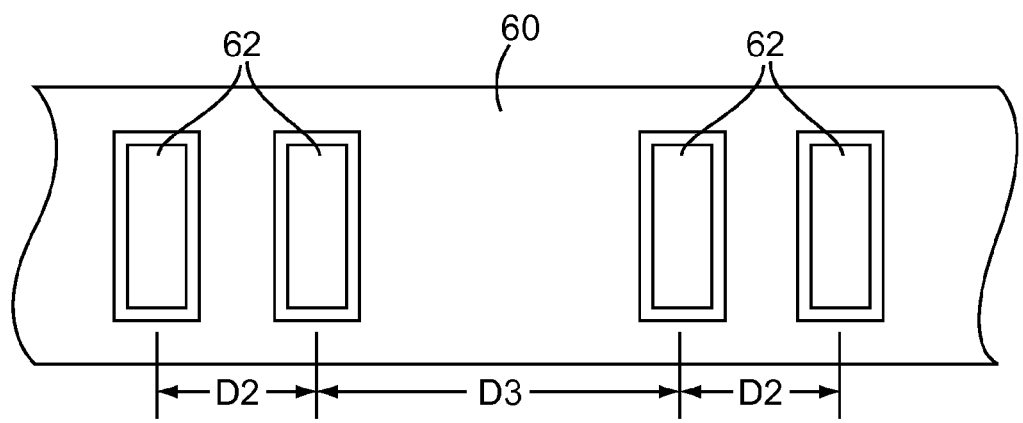
FIG. 6B shows an example of markers spaced at a predetermined distance from each other where the distance is varying.

FIGS. 6A and 6B show examples of markers 62 spaced at a predetermined distance from each other. In FIG. 6A, markers 62 are disposed on carrier 60 where the distance D1 between markers is regular. Distance D1 can be any desired distance, for example, D1 may be in the range of 2 cm to 5 cm, 5 cm to 10 cm, 10 cm to 30 cm or 0.3 m to 2 m or any other desired distance. Exemplary distances are further discussed in the Examples section. Distance D1 can be determined based on factors such as a distance between a marker and a locator, the number of markers used, whether clusters of markers are used, and whether a path or discrete points need to be located. Distance D1 can be used to code information about the asset associated with markers 62. For example, different distances D1 could identify different types of assets, what the particular asset is, the depth of the asset, if buried underground, the owner of the asset, or any other desired information.

Marker 62 frequency can also be used to encode information. While the frequency of a single marker can be associated with a particular type of utility, markers could also be tuned to different frequencies to encode information. For example, in an application where two markers are attached to the same asset, a first marker could be tuned to a frequency $f_1$, and a second marker could be tuned to a frequency $f_2$. Frequencies $f_1$ and $f_2$ could be any desired frequencies. For example, $f_1$ could indicate the type of asset marked, such as the type of utility, and $f_2$ could indicate the owner of the asset.

Figure 7:
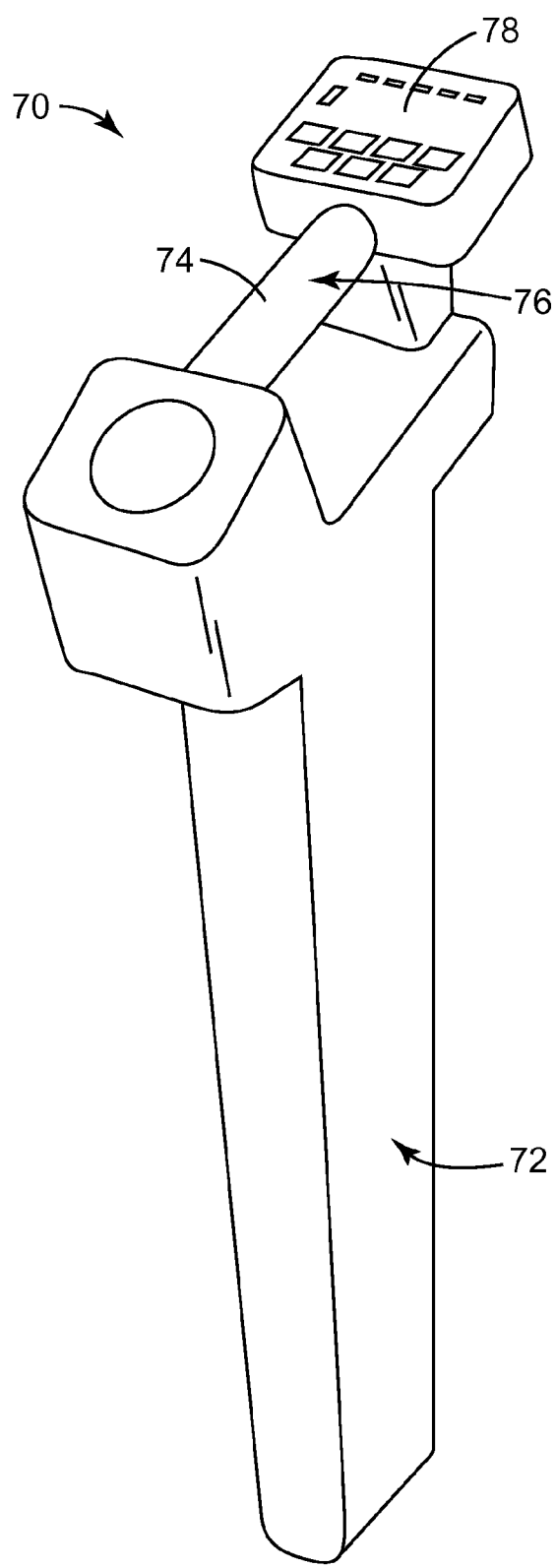
FIG. 7 shows an exemplary portable locating device.

FIG. 6B shows an example of markers 62 spaced at a predetermined distance from each other where the distance is varying. Such varying distances D2 and D3 can also be used to encode information, such as the type of asset, owner of the asset, depth of the asset, or any other desired information about an asset that can be associated with the spatial arrangement of markers 62. D2 and D3 can be in the range of 2 cm to 5 cm, 5 cm to 10 cm, 10 cm to 30 cm or 0.3 m to 2 m or any other desired distance FIG. 7 shows an exemplary portable locating device 70. In this illustrated locating device 70, a single antenna 72 is used to generate an electromagnetic field and to detect a response of a magnetomechanical marker. In another embodiment, one antenna could be used for generating an electromagnetic field and a second antenna could be used for detecting the response of a magnetomechanical marker to the generated field.

Battery 76 provides power to portable locating device 70. Battery 76 can be, for example, several common household batteries such as type AA, B or C batteries, or any other type of battery. Handle 74 can be used to carry portable locating device 70. In one embodiment, battery 76 can be disposed inside handle 74, which can improve the weight distribution of the portable locating device 70.

Display 78 can provide a user with a variety of information about located markers and the assets markers are associated with. For example, it can provide information about marker and asset depth, direction, or other information about markers. One exemplary portable locating device is the 3M™ Dynatel™ 1420 Locator, distributed by 3M Company of St. Paul, Minn. In one embodiment, the 1420 Locator firmware can be programmed so as to tune the antenna 72 to radiate a particular, or several particular desired frequencies.

EXAMPLES

As discussed in the present disclosure, magnetomechanical markers can be used to mark stationary assets buried underground and can be detected by a portable locating device. The Examples below illustrate the viability of using a single magnetomechanical marker or a cluster of magnetomechanical markers to mark and eventually locate underground assets.

All of the magnetomechanical markers used in the following examples complied with specifications for the UltraStrip® III electronic article security labels from Sensormatic Electronics Corporation, headquartered in Boca Raton, Fla. The magnetomechanical markers were disposed on a non-conductive surface. The reader or locator used in all of the examples was a 3M Dynatel™ 1420 EMS-iD Marker Locator (1420 Locator) available from 3M Company of St. Paul, Minn. Firmware modifications were made to the 1420 Locator to tune the antenna to approximately 58 kHz. The 1420 Locator contains a solenoid wound coil antenna with a ferrite core.

For experimental simplicity, all marker detections presented in the examples below were conducted in free air. At the frequencies involved, the signal strength of markers in free air is expected to be the equivalent of signal strength of markers underground. A few orientations of tag separation presented in the examples were placed underground up to a ground depth of 92 centimeters to verify that free air measurements equated to underground detections and no degradation of signal strength was noted over the measurements obtained in free air.

All vertical or horizontal distances as shown in the tables below are measured from the center point of a marker and/or the center point of the antenna of the locator. Vertical distances indicate the height of the locator antenna above the plane the markers were disposed in. Horizontal distances indicate how far the locator antenna is offset to a side of a marker. Individual markers were positioned such that the resonant strips thereof were oriented horizontally to ground level and signal strength detections were taken with the locator antenna in two separate orientations relative to the marker orientation. In one detection orientation, the locator antenna was parallel to the length of the marker. In the second detection orientation, the locator antenna was orthogonal to the marker. In each of these detection orientations, the locator was positioned at various distances to assess signal strength of the marker.

All experiments were conducted in a laboratory where electronic background noise was present in the following examples. The background noise varied per lab location, day of week, time of day and orientation of the locator. Thus all signal strength detections listed include background noise. To ensure the accuracy of the measured value in light of the background noise, a second detection was taken in each orientation and distance with the marker removed. In other words, a detection was taken with the marker(s) in the described position and then a second detection was taken with the marker(s) removed from the described position and located a distance away so as not to contribute signal to the value of the second detection. If the detection value changed, then the gross detection level was recorded. If there was no observed change in the read value with marker removed when compared to the read value with the marker in position, then it was concluded that no measurable signal strength was produced by the markers for the distance and reader orientation, and the recorded value was listed as "Bkgd" (background).

Figure 8:
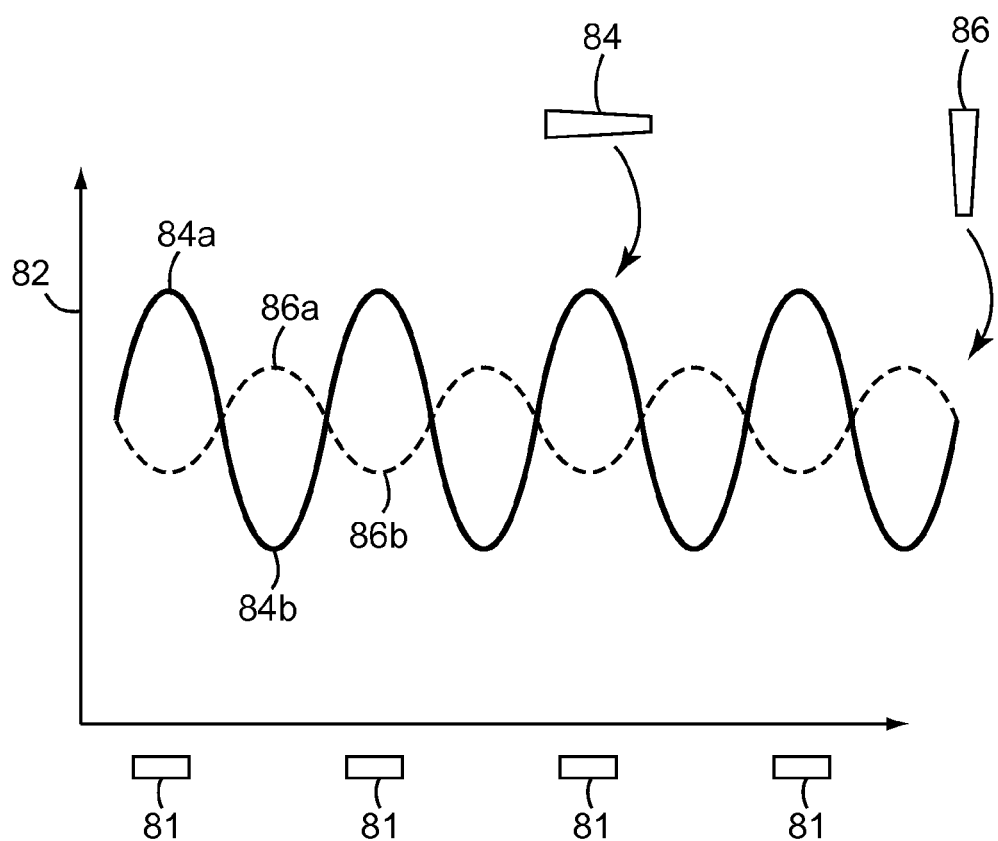
FIG. 8 shows the relative signal strength of markers or clusters based on locator antenna orientation for both a parallel orientation and an orthogonal orientation.

FIG. 8 shows the relative signal strength along axis 82 of the markers or clusters 81 based on locator antenna orientation for both a parallel orientation 84 and an orthogonal orientation 86. As discussed in more detail with respect to the individual examples, when the markers or clusters 81 were parallel 84 to the locator antenna (i.e., the locator antenna was horizontal), the maximum signal amplitude 84*a* was greater than when the locator antenna was positioned orthogonally 86 to the markers or clusters 81. The maximum signal amplitude for a parallel orientation occurred directly over a marker or cluster 81. The minimum signal amplitude 84*b* for a parallel configuration 86 occurred in between marker or cluster 81 locations. When the locator antenna was orthogonal 86 to the markers or clusters 81 (i.e. vertical), the maximum signal 86*a* was lower and the minimum signal 86*b* was greater than the parallel configuration 84 above. For the orthogonal configuration 86, the maximum signal 86*a* occurred in between markers or clusters 81, while the minimum signal 86*b* occurred directly over the marker or cluster 81.

Example 1

Individual Markers

Figure 9A:
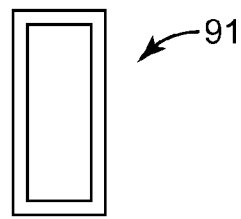
FIGS. 9A-9F show a variety of marker configures used in the Examples.

Signal strength values were determined for a single marker 91, as shown in FIG. 9A, and for three single markers 91 in a row with increasing horizontal spacing between single markers 91. The locator antenna orientations were parallel and orthogonal to the markers 91 as described above.

Signal strength measurements for the configuration with the locator antenna orthogonal to single marker 91 and three single markers 91 in a line at various spacings are shown in Table 1. For the configuration with the locator antenna orthogonal to the single marker 91, the minimum signal strength detection occurred over the vertical midpoint of the marker 91. The maximum measured signal strength occurred at a horizontal distance from the vertical midpoint of the marker 91. The horizontal distance of the maximum signal strength measured varied with the vertical distance of the locator antenna above the marker 91, as shown in Table 1.

For the orientation with the locator antenna orthogonal to the single marker 91, although the horizontal distance required from the vertical mid point of the marker 91 to obtain the maximum signal strength position increased as vertical distance increased, the overall magnitude of the measured signal strength decreased. For three single markers 91, at all vertical distances, the maximum detection with the locator antenna orthogonal to the marker occurred at a position midway horizontally between adjacent markers 91.

TABLE 1

Locator Antenna Orthogonal to Marker

| Horizontal Distance (centimeters) | Vertical Distance (centimeters) | Single Marker Maximum Signal (dB) | 3 Markers in a Row Spacing Between Adjacent Markers (centimeters) | 3 Markers in a Row Maximum Signal (dB) | 3 Markers in a Row Minimum Signal (dB) |
|---|---|---|---|---|---|
| 25.4 | 30.5 | 53 | 50.8 | 59 | 44 |
| 38.1 | 45.7 | 48 | 76.2 | 54 | 39 |
| 45.7 | 61.0 | 38 | 91.5 | 42 | 27 |
| 55.9 | 76.2 | 30 | 112 | 35 | 21 |
| 71.1 | 91.5 | 22 | 142 | 26 | Bkgd |

Signal strength measurements for the configuration with the locator antenna parallel to the marker 91 are shown in Table 2. For the configuration with the locator antenna parallel to the single marker 91, the maximum measured signal strength occurred directly over the marker 91. This was also true for three markers 91 in a row. The minimum measured signal strength of a single marker with the locator antenna parallel to the marker 91 occurred at a horizontal distance from the vertical midpoint of the marker 91. The horizontal distance of the minimum signal strength measured varied with the vertical distance of the locator antenna above the marker 91, as shown in Table 2. The minimum measured signal strength for three markers 91 in a row occurred midway between two adjacent markers 91.

TABLE 2

Locator Antenna Parallel to Marker

| Horizontal Distance (centimeters) | Vertical Distance (centimeters) | Single Marker Maximum Signal (dB) | 3 Markers in a Row Spacing Between Adjacent Markers (centimeters) | 3 Markers in a Row Maximum Signal (dB) | 3 Markers in a Row Minimum Signal (dB) |
|---|---|---|---|---|---|
| 25.4 | 30.5 | 85 | 50.8 | 84 | 48 |
| 38.1 | 45.7 | 68 | 76.2 | 69 | 29 |
| 45.7 | 61.0 | 52 | 91.5 | 57 | 17 |
| 55.9 | 76.2 | 43 | 112 | 46 | Bkgd |
| 71.1 | 91.5 | 34 | 142 | 34 | Bkgd |
| 71.1 | 107 | 28 | 142 | 27 | Bkgd |
| 71.1 | 122 | Bkgd | 142 | 20 | Bkgd |

Example 2

Two Marker Cluster with Markers in a Side by Side Configuration

Figure 9B:
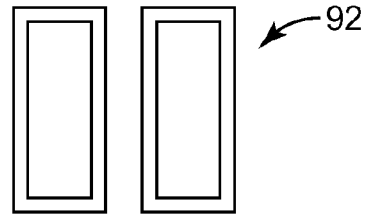

Signal strength values were determined for a two marker cluster 92 with markers in a side by side orientation, as shown in FIG. 9B. Signal strength was also determined for three separate two marker clusters 92 in a row with increasing horizontal spacing between marker clusters 92. The locator antenna orientations were parallel and orthogonal to marker clusters 92 as described above.

Signal strength measurements for the configuration with the locator antenna orthogonal to two marker cluster 92 and three two marker clusters 92 in a line at various spacings are shown in Table 3. For the configuration with the locator antenna orthogonal to the two marker cluster 92, the minimum signal strength detection occurred over the vertical midpoint of the two marker cluster 92. The maximum measured signal strength occurred at a horizontal distance from the vertical midpoint of the two marker cluster 92. The horizontal distance of the maximum signal strength measured varied with the vertical distance of the locator antenna above the two marker cluster 92, as shown in Table 3.

For the orientation with the locator antenna orthogonal to the two marker cluster 92, although the horizontal distance required from the vertical mid point of the two marker cluster 92 to obtain the maximum signal strength position increased as vertical distance increased, the overall magnitude of the measured signal strength decreased. For three two marker clusters 92, at all vertical distances, the maximum detection with the locator antenna orthogonal to the marker occurred at a position midway horizontally between adjacent clusters 92.

TABLE 3

Locator Antenna Orthogonal to Two Marker Clusters with Markers in a Side by Side Configuration

| Horizontal Distance (centimeters) | Vertical Distance (centimeters) | Two Marker Cluster Maximum Signal (dB) | 3 Two Marker Clusters in a Row Spacing Between Adjacent Clusters (centimeters) | 3 Two Marker Clusters in a Row Maximum Signal (dB) | 3 Two Marker Clusters in a Row Minimum Signal (dB) |
|---|---|---|---|---|---|
| 25.4 | 30.5 | 65 | 50.8 | 70 | 58 |
| 35.6 | 45.7 | 52 | 71.1 | 56 | 39 |
| 45.7 | 61.0 | 41 | 91.5 | 47 | 32 |
| 55.9 | 76.2 | 35 | 112 | 39 | 27 |
| 61.0 | 91.5 | 24 | 122 | 31 | 22 |

Signal strength measurements for the configuration with the locator antenna parallel to the two marker clusters 92 are shown in Table 4. For the configuration with the locator antenna parallel to the three two marker clusters 92, the maximum measured signal strength occurred directly over cluster 92. The minimum measured signal strength for three two marker clusters 92 in a row occurred midway between two adjacent clusters 92.

TABLE 4

Locator Antenna Parallel to Two Marker Clusters with Markers in a Side by Side Configuration

| Horizontal Distance (centimeters) | Vertical Distance (centimeters) | 3 Two Marker Clusters in a Row Spacing Between Adjacent Clusters (centimeters) | 3 Two Marker Clusters in a Row Maximum Signal (dB) | 3 Two Marker Clusters in a Row Minimum Signal (dB) |
|---|---|---|---|---|
| 25.4 | 30.5 | 50.8 | 89 | 56 |
| 35.6 | 45.7 | 71.1 | 73 | 38 |
| 45.7 | 61 | 91.5 | 59 | 26 |
| 55.9 | 76.2 | 112 | 52 | 17 |
| 61 | 91.5 | 122 | 39 | 25 |
| 61 | 107 | 122 | 34 | Bkgd |
| 61 | 122 | 122 | 27 | Bkgd |

Example 3

Two Marker Cluster with Markers in an End to End Configuration

Figure 9C:
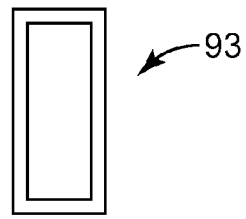

Signal strength values were determined for a two marker cluster 93 with markers in an end to end orientation, as shown in FIG. 9C. Signal strength was also determined for three separate two marker clusters 93 in a row with increasing horizontal spacing between marker clusters 93. The locator antenna orientations were parallel and orthogonal to marker clusters 93 as described above.

Signal strength measurements for the configuration with the locator antenna orthogonal to two marker cluster 93 and three two marker clusters 93 in a line at various spacings are shown in Table 5. For the configuration with the locator antenna orthogonal to the two marker cluster 93, the minimum signal strength detection occurred over the vertical midpoint of the two marker cluster 93. The maximum measured signal strength occurred at a horizontal distance from the vertical midpoint of the two marker cluster 93. The horizontal distance of the maximum signal strength measured varied with the vertical distance of the locator antenna above the two marker cluster 93, as shown in Table 5.

For the orientation with the locator antenna orthogonal to the two marker cluster 93, although the horizontal distance required from the vertical mid point of the two marker cluster 93 to obtain the maximum signal strength position increased as vertical distance increased, the overall magnitude of the measured signal strength decreased. For three two marker clusters 93, at all vertical distances, the maximum detection with the locator antenna orthogonal to the marker occurred at a position midway horizontally between adjacent clusters 93.

TABLE 5

Locator Antenna Orthogonal to Two Marker Cluster with Markers in an End to End Configuration

| Horizontal Distance (centimeters) | Vertical Distance (centimeters) | Two Marker Cluster Maximum Signal (dB) | 3 Two Marker Clusters in a Row Spacing Between Adjacent Clusters (centimeters) | 3 Two Marker Clusters in a Row Maximum Signal (dB) | 3 Two Marker Clusters in a Row Minimum Signal (dB) |
|---|---|---|---|---|---|
| 30 | 30.5 | 59 | 55.9 | 67 | 54 |
| 35.6 | 45.7 | 46 | 71.1 | 50 | 37 |
| 45.7 | 61 | 37 | 91.5 | 39 | 27 |
| 55.9 | 76.2 | 27 | 112 | 31 | 22 |
| 61 | 91.5 | Bkgd | 122 | 23 | 22 |

Signal strength measurements for the configuration with the locator antenna parallel to the two marker clusters 93 are shown in Table 6. For the configuration with the locator antenna parallel to the three two marker clusters 93, the maximum measured signal strength occurred directly over cluster 93. The minimum measured signal strength for three two marker clusters 93 in a row occurred midway between two adjacent clusters 93.

TABLE 6

Locator Antenna Parallel to Two Marker Cluster with Markers in an End to End Configuration

| Horizontal Distance (centimeters) | Vertical Distance (centimeters) | 3 Two Marker Clusters in a Row Spacing Between Adjacent Clusters (centimeters) | 3 Two Marker Clusters in a Row Maximum Signal (dB) | 3 Two Marker Clusters in a Row Minimum Signal (dB) |
|---|---|---|---|---|
| 30 | 30.5 | 55.9 | 85 | 50 |
| 35.6 | 45.7 | 71.1 | 70 | 31 |
| 45.7 | 61 | 91.5 | 55 | 22 |
| 55.9 | 76.2 | 112 | 47 | Bkgd |
| 61 | 91.5 | 122 | 37 | 23 |
| 61 | 107 | 122 | 31 | Bkgd |
| 61 | 122 | 122 | 24 | Bkgd |

Example 4

Four Marker Cluster with Markers in a Side by Side Configuration

Figure 9D:
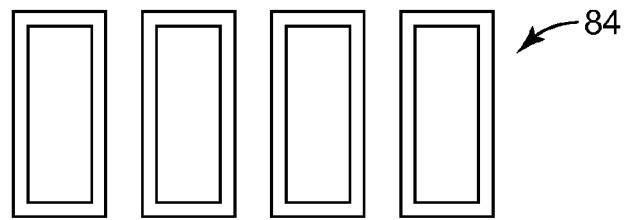

Signal strength values were determined for a four marker cluster 94 with markers in a side by side orientation, as shown in FIG. 9D. Signal strength was also determined for three separate four marker clusters 94 in a row with increasing horizontal spacing between marker clusters 94. The locator antenna orientations were parallel and orthogonal to marker clusters 94 as described above.

Signal strength measurements for the configuration with the locator antenna orthogonal to four marker cluster 94 and three four marker clusters 94 in a line at various spacings are shown in Table 7. For the configuration with the locator antenna orthogonal to the four marker cluster 94, the minimum signal strength detection occurred over the vertical midpoint of four marker cluster 94. The maximum measured signal strength occurred at a horizontal distance from the vertical midpoint of four marker cluster 94. The horizontal distance of the maximum signal strength measured varied with the vertical distance of the locator antenna above the four marker cluster 94, as shown in Table 7.

For the orientation with the locator antenna orthogonal to the four marker cluster 94, although the horizontal distance required from the vertical mid point of the four marker cluster 94 to obtain the maximum signal strength position increased as vertical distance increased, the overall magnitude of the measured signal strength decreased. For three four marker clusters 94, at all vertical distances, the maximum detection with the locator antenna orthogonal to the marker occurred at a position midway horizontally between adjacent clusters 94.

TABLE 7

Locator Antenna Orthogonal to Four Marker Cluster with Markers in a Side by Side Configuration

| Horizontal Distance (centimeters) | Vertical Distance (centimeters) | Four Marker Cluster Maximum Signal (dB) | 3 Four Marker Clusters in a Row Spacing Between Adjacent Clusters (centimeters) | 3 Four Marker Clusters in a Row Maximum Signal (dB) | 3 Four Marker Clusters in a Row Minimum Signal (dB) |
|---|---|---|---|---|---|
| 30.5 | 30.5 | 67 | 70 | 71 | 44 |
| 45.7 | 61 | 47 | 91.5 | 52 | 41 |

TABLE 7-continued

Locator Antenna Orthogonal to Four Marker Cluster with Markers in a Side by Side Configuration

| Horizontal Distance (centimeters) | Vertical Distance (centimeters) | Four Marker Cluster Maximum Signal (dB) | 3 Four Marker Clusters in a Row Spacing Between Adjacent Clusters (centimeters) | 3 Four Marker Clusters in a Row Maximum Signal (dB) | 3 Four Marker Clusters in a Row Minimum Signal (dB) |
|---|---|---|---|---|---|
| 66 | 91.5 | 32 | 132 | 38 | 27 |
| 73.7 | 107 | 30 | 147 | 34 | 20 |
| 66 | 122 | 23 | 132 | 28 | Bkgd |

Signal strength measurements for the configuration with the locator antenna parallel to the four marker clusters 94 are shown in Table 8. For the configuration with the locator antenna parallel to the three four marker clusters 94, the maximum measured signal strength occurred directly over four marker cluster 94. The minimum measured signal strength for three four marker clusters 94 in a row occurred midway between two adjacent clusters 94.

TABLE 8

Locator Antenna Parallel to Four Marker Cluster with Markers in a Side by Side Configuration

| Horizontal Distance (centimeters) | Vertical Distance (centimeters) | 3 Four Marker Clusters in a Row Spacing Between Adjacent Clusters (centimeters) | 3 Four Marker Clusters in a Row Maximum Signal (dB) | 3 Four Marker Clusters in a Row Minimum Signal (dB) |
|---|---|---|---|---|
| 30.5 | 30.5 | 61.0 | 93 | 55 |
| 45.7 | 61 | 91.4 | 65 | 29 |
| 66 | 91.4 | 132 | 49 | 24 |
| 73.7 | 107 | 147 | 43 | Bkgd |
| 66 | 122 | 132 | 43 | Bkgd |
| 73.7 | 137 | 147 | 32 | Bkgd |
| 73.7 | 152 | 147 | 29 | Bkgd |
| 73.7 | 168 | 147 | 27 | Bkgd |

Example 5

Four Marker Cluster with Markers in a Two by Two Configuration

Figure 9E:
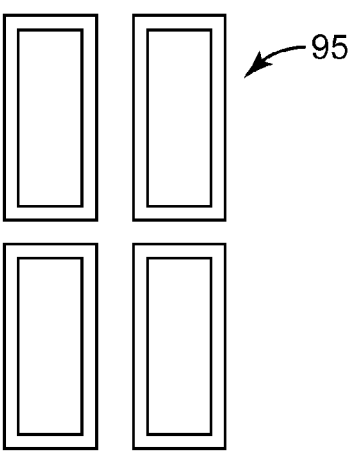

Signal strength values were determined for a four marker cluster 95 with markers in a two by two configuration, as shown in FIG. 9E. Signal strength was also determined for three separate four marker clusters 95 in a row with increasing horizontal spacing between marker clusters 95. The locator antenna orientations were parallel and orthogonal to marker clusters 95 as described above.

Signal strength measurements for the configuration with the locator antenna orthogonal to four marker cluster 95 and three four marker clusters 95 in a line at various spacings are shown in Table 9. For the configuration with the locator antenna orthogonal to the four marker cluster 95, the minimum signal strength detection occurred over the vertical midpoint of four marker cluster 95. The maximum measured signal strength occurred at a horizontal distance from the vertical midpoint of four marker cluster 95. The horizontal distance of the maximum signal strength measured varied with the vertical distance of the locator antenna above the four marker cluster 95, as shown in Table 9.

For the orientation with the locator antenna orthogonal to the four marker cluster 95, although the horizontal distance required from the vertical mid point of the four marker cluster 95 to obtain the maximum signal strength position increased as vertical distance increased, the overall magnitude of the measured signal strength decreased. For three four marker clusters 95, at all vertical distances, the maximum detection with the locator antenna orthogonal to the marker occurred at a position midway horizontally between adjacent clusters 95.

TABLE 9

Locator Antenna Orthogonal to Four Marker Cluster with Markers in a Two by Two Arrangement

| Horizontal Distance (centimeters) | Vertical Distance (centimeters) | Four Marker Cluster Maximum Signal (dB) | 3 Four Marker Clusters in a Row Spacing Between Adjacent Markers (centimeters) | 3 Four Marker Clusters in a Row Maximum Signal (dB) | 3 Four Marker Clusters in a Row Minimum Signal (dB) |
|---|---|---|---|---|---|
| 30.5 | 30.5 | 68 | 61 | 67 | 49 |
| 45.7 | 61 | 49 | 91.4 | 53 | 44 |
| 61 | 91.4 | 32 | 122 | 37 | 29 |
| 73.7 | 107 | 28 | 147 | 35 | 21 |
| 76.2 | 122 | 24 | 152 | 23 | Bkgd |

Signal strength measurements for the configuration with the locator antenna parallel to the four marker clusters 95 are shown in Table 10. For the configuration with the locator antenna parallel to the three four marker clusters 95, the maximum measured signal strength occurred directly over four marker cluster 95. The minimum measured signal strength for three four marker clusters 95 in a row occurred midway between two adjacent clusters 95.

TABLE 10

Locator Antenna Parallel to Four Marker Cluster with Markers in a Two by Two Arrangement

| Horizontal Distance (centimeters) | Vertical Distance (centimeters) | 3 Four Marker Clusters in a Row Spacing Between Adjacent Markers (centimeters) | 3 Four Marker Clusters in a Row Maximum Signal (dB) | 3 Four Marker Clusters in a Row Minimum Signal (dB) |
|---|---|---|---|---|
| 30.5 | 30.5 | 61 | 93 | 48 |
| 45.7 | 61 | 91.4 | 67 | 29 |
| 61 | 91.4 | 122 | 52 | 20 |
| 73.7 | 107 | 147 | 45 | Bkgd |
| 76.2 | 122 | 152 | 40 | Bkgd |
| 73.7 | 137 | 147 | 36 | Bkgd |
| 73.7 | 152 | 147 | 33 | Bkgd |
| 73.7 | 168 | 147 | 29 | Bkgd |

Example 6

Four Marker Cluster with Markers in an End to End Configuration

Figure 9F:
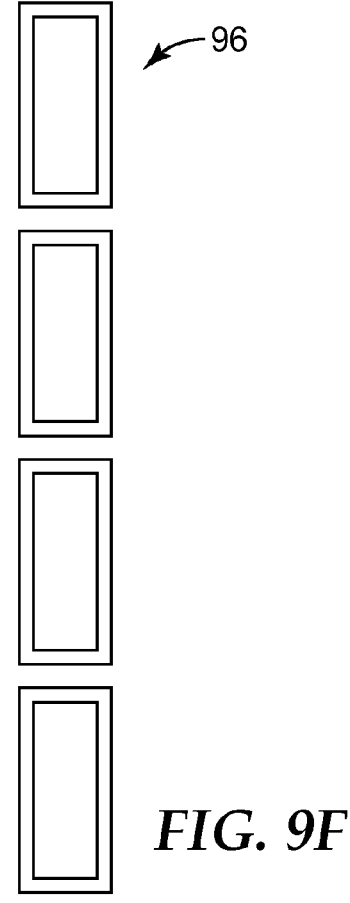

Signal strength values were determined for a four marker cluster 96 with markers in an end to end configuration, as shown in FIG. 9F. Signal strength was also determined for three separate four marker clusters 96 in a row with increasing horizontal spacing between marker clusters 96. The locator antenna orientations were parallel and orthogonal to marker clusters 96 as described above.

Signal strength measurements for the configuration with the locator antenna orthogonal to four marker cluster 96 and three four marker clusters 96 in a line at various spacings are shown in Table 11. For the configuration with the locator antenna orthogonal to the four marker cluster 96, the minimum signal strength detection occurred over the vertical midpoint of four marker cluster 96. The maximum measured signal strength occurred at a horizontal distance from the vertical midpoint of four marker cluster 96. The horizontal distance of the maximum signal strength measured varied with the vertical distance of the locator antenna above the four marker cluster 96, as shown in Table 11.

For the orientation with the locator antenna orthogonal to the four marker cluster 96, although the horizontal distance required from the vertical mid point of the four marker cluster 96 to obtain the maximum signal strength position increased as vertical distance increased, the overall magnitude of the measured signal strength decreased. For three four marker clusters 96, at all vertical distances, the maximum detection with the locator antenna orthogonal to the marker occurred at a position midway horizontally between adjacent clusters 96.

TABLE 11

Locator Antenna Orthogonal to Four Marker Cluster with Markers Arranged in an End to End Configuration

| Horizontal Distance (centimeters) | Vertical Distance (centimeters) | Four Marker Cluster Maximum Signal (dB) | 3 Four Marker Clusters in a Row Spacing Between Adjacent Markers (centimeters) | 3 Four Marker Clusters in a Row Maximum Signal (dB) | 3 Four Marker Clusters in a Row Minimum Signal (dB) |
|---|---|---|---|---|---|
| 27.9 | 30.5 | 60 | 61.0 | 66 | 55 |
| 45.7 | 61.0 | 39 | 91.4 | 43 | 34 |
| 61.0 | 91.4 | 25 | 122 | 29 | Bkgd |
| 73.7 | 107 | 22 | 147 | 30 | Bkgd |

Signal strength measurements for the configuration with the locator antenna parallel to the four marker clusters 96 are shown in Table 12. For the configuration with the locator antenna parallel to the three four marker clusters 96, the maximum measured signal strength occurred directly over four marker cluster 96. The minimum measured signal strength for three four marker clusters 96 in a row occurred midway between two adjacent clusters 96.

TABLE 12

Locator Antenna Parallel to Four Marker Cluster with Markers Arranged in an End to End Configuration

| Horizontal Distance (centimeters) | Vertical Distance (centimeters) | 3 Four Marker Clusters in a Row Spacing Between Adjacent Markers (centimeters) | 3 Four Marker Clusters in a Row Maximum Signal (dB) | 3 Four Marker Clusters in a Row Minimum Signal (dB) |
|---|---|---|---|---|
| 27.9 | 30.5 | 55.9 | 87 | 56 |
| 45.7 | 61.0 | 91.4 | 61 | 28 |
| 61.0 | 91.4 | 122 | 44 | 20 |
| 73.7 | 107 | 147 | 38 | Bkgd |
| 73.7 | 122 | 147 | 33 | Bkgd |
| 73.7 | 137 | 147 | 28 | Bkgd |
| 73.7 | 152 | 147 | 21 | Bkgd |
| 73.7 | 168 | 147 | Bkgd | Bkgd |

The exemplary embodiments described above offer a variety of configurations of magnetomechanical markers for marking stationary assets.

From the "Locator Antenna Orthogonal to Four Marker Cluster with Markers in a Side by Side Configuration" data as shown in Table 7, one can readily imagine a buried pipe buried at about a 36" depth and marked with such clusters spaced about every 52" and locatable continuously along a path with a 1420 Locator. Alternatively, from the "Locator Antenna Parallel to Four Marker Cluster with Markers in a Side by Side Configuration" data as shown in Table 8, one can imagine a pipe buried at a depth of about 48" and marked with such clusters spaced about every 48", and locatable along a path (albeit with "null" signal regions between maximum signal regions) using a 1420 Locator with the antenna in a horizontal orientation. In the same way one can envision other arrangements of markers and clusters to mark and later locate buried assets.

The Examples above demonstrate several noteworthy results. While using a different locating device with a different antenna design may result in different outcomes, the following observations may provide guidance in understanding the present disclosure.

In the Examples as set forth, for a given Locator antenna to marker spatial orientation, marker clusters having more markers generally yielded greater signal and more detection range than clusters with fewer, or a single, marker. Further, the "Locator Antenna Parallel . . . " spatial relationship generally yielded higher maximum signals than the "Locator Antenna Orthogonal . . . " spatial relationship for the same marker/clusters. However, the "Locator Antenna Parallel . . . " minimum signals are less than those of the same-case "Locator Antenna Orthogonal . . . " spatial relationship. In other words, the "parallel" spatial relationship yielded greater maximum signal and detection range in a vertical direction. However, the "orthogonal" spatial relationship tended to have a greater detection range as the distance between markers or clusters was increased. Additionally, as the vertical distance between the antenna and the marker or cluster was increased, the horizontal separation distance between clusters could also be increased.

Finally, there were differing results with clusters in the end to end, side by side, and combination (or two by two) configuration. While the side by side configuration yielded a stronger signal and therefore maximum detection range compared to the other two configurations, there can be other advantages for the end to end configuration. For example, markers may be installed in an end to end configuration on an asset with a small radius more easily than in a side by side configuration.

Positional terms used throughout the disclosure, e.g., over, under, above, etc., are intended to provide relative positional information; however, they are not intended to require adjacent disposition or to be limiting in any other manner. For example, when a layers or structure is said to be "disposed over" another layer or structure, this phrase is not intended to be limiting on the order in which the layers or structures are assembled but simply indicates the relative spatial relationship of the layers or structures being referred to. Furthermore, all numerical limitations shall be deemed to be modified by the term "about."

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for locating an asset buried underground, the system comprising:
   a first cluster of magnetomechanical markers disposed on a carrier;
   a second cluster of magnetomechanical markers disposed on the carrier, wherein each cluster comprises at least two magnetomechanical markers, wherein an intervening space is disposed on the carrier between the first cluster and the second cluster, wherein a distance separating the first cluster from the second cluster is greater than a distance separating each magnetomechanical marker within the first cluster; and
   a portable locating device, wherein the locating device includes at least a single antenna and a battery.

2. The system of claim 1, wherein the magnetomechanical markers of each cluster are arranged in a parallel array.

3. The system of claim 2, wherein the magnetic bias layer polarity of each magnetomechanical marker within the cluster is the same.

4. The system of claim 1, wherein the carrier is arranged so that it is in a planar or a curved configuration.

5. The system of claim 1, wherein a first magnetomechanical marker is tuned to a first frequency and a second magnetomechanical marker is tuned to a second frequency, wherein the first frequency is different from the second frequency.

6. The system of claim 1, wherein at least one magnetomechanical marker is tuned to a resonant frequency within the range of 57 kHz to 59 kHz.

7. The system of claim 1, wherein the locator provides information regarding a path of the asset.

8. The system of claim 1, wherein the distance separating the first cluster from the second cluster is a fixed distance.

9. The system of claim 1, wherein each marker of the first cluster of magnetomechanical markers is arranged in a side-by-side parallel array.

10. The system of claim 1, wherein each marker of the first cluster of magnetomechanical markers is arranged in an end-to-end parallel array.

11. The system of claim 1, wherein the asset comprises a pipe.

12. The system of claim 11, wherein the locator provides information regarding a path of the pipe.

13. The system of claim 1, further comprising a third cluster of magnetomechanical markers disposed on the carrier, wherein the distance separating the each cluster is a fixed distance.

14. The system of claim 1, wherein the carrier is associated with the buried asset.

15. The system of claim 1, wherein the carrier is placed underground within 1 meter of the asset.

16. The system of claim 1, wherein the carrier comprises a generally non-conductive substrate.

17. A system for locating an asset buried underground, the system comprising:
   a first cluster of magnetomechanical markers disposed on a carrier;
   a second cluster of magnetomechanical markers disposed on the carrier, wherein each cluster comprises at least two magnetomechanical markers, wherein a distance separating the first cluster from the second cluster is greater than a distance separating each magnetomechanical marker within the first cluster; and
   a portable locating device, wherein the locating device includes at least a single antenna and a battery wherein the carrier is placed underground within 1 meter of the asset.

18. A system for locating the path of a pipe or cable buried underground, the system comprising:
   a first cluster of magnetomechanical markers disposed on a carrier;
   a second cluster of magnetomechanical markers disposed on the carrier, wherein each cluster comprises at least two magnetomechanical markers, wherein an intervening space is disposed on the carrier between the first cluster and the second cluster, wherein a distance separating the first cluster from the second cluster is greater than a distance separating each magnetomechanical marker within the first cluster; and
   a portable locating device, wherein the locating device includes at least a single antenna and a battery, wherein the carrier is associated with the buried pipe or cable.

* * * * *

UNITED STATES PATENT AND TRADEMARK OFFICE
CERTIFICATE OF CORRECTION

| | | |
|---|---|---|
| PATENT NO. | : 9,013,274 B2 | Page 1 of 1 |
| APPLICATION NO. | : 12/888272 | |
| DATED | : April 21, 2015 | |
| INVENTOR(S) | : Ziyad Doany | |

It is certified that error appears in the above-identified patent and that said Letters Patent is hereby corrected as shown below:

IN THE CLAIMS

Column 18
Line 34, In Claim 17, delete "battery" and insert -- battery, --, therefor.

Signed and Sealed this
Second Day of February, 2016

Michelle K. Lee
*Director of the United States Patent and Trademark Office*